(12) United States Patent
Patel

(10) Patent No.: US 7,290,080 B2
(45) Date of Patent: Oct. 30, 2007

(54) APPLICATION PROCESSORS AND MEMORY ARCHITECTURE FOR WIRELESS APPLICATIONS

(75) Inventor: Mukesh K. Patel, Fremont, CA (US)

(73) Assignee: Nazomi Communications Inc., Santa Clara, CA (US)

( * ) Notice: Subject to any disclaimer, the term of this patent is extended or adjusted under 35 U.S.C. 154(b) by 423 days.

(21) Appl. No.: 10/405,600

(22) Filed: Apr. 1, 2003

(65) Prior Publication Data

US 2004/0024955 A1    Feb. 5, 2004

(51) Int. Cl.
*G06F 12/00* (2006.01)

(52) U.S. Cl. .................. 711/100; 711/102; 711/104

(58) Field of Classification Search .............. None
See application file for complete search history.

(56) References Cited

U.S. PATENT DOCUMENTS

| | | | |
|---|---|---|---|
| 4,084,250 A * | 4/1978 | Albertine et al. ........... 361/687 |
| 5,925,123 A | 7/1999 | Tremblay et al. |
| 5,937,193 A | 8/1999 | Evoy |
| 6,021,469 A | 2/2000 | Tremblay et al. |
| 6,026,485 A | 2/2000 | O'Connor et al. |
| 6,038,643 A | 3/2000 | Tremblay et al. |
| 6,317,869 B1 | 11/2001 | Adl-Tabatabai et al. |
| 6,438,720 B1 * | 8/2002 | Boutaud et al. ............ 714/724 |
| 6,446,192 B1 | 9/2002 | Narasimhan et al. |
| 6,714,977 B1 * | 3/2004 | Fowler et al. ............. 709/224 |
| 6,976,217 B1 * | 12/2005 | Vertaschitsch et al. ...... 715/717 |
| 2001/0040827 A1 * | 11/2001 | Dosaka et al. ......... 365/189.01 |
| 2004/0153839 A1 * | 8/2004 | Misaka et al. ............... 714/39 |
| 2004/0263523 A1 * | 12/2004 | Satoh et al. ............... 345/530 |

FOREIGN PATENT DOCUMENTS

| | | |
|---|---|---|
| EP | 0 498 454 A2 | 8/1992 |
| EP | 1 067 749 A2 | 1/2001 |
| WO | WO94/19743 | 9/1994 |

OTHER PUBLICATIONS

C. John Glossner and Stamatis Vassiliadis, *The Delft-Java Engine: An Introduction*, Euro-Part '97, Parallel Processing, Third International Euro-Par Conference, pp. 766-770 (Aug. 1997).

M.W. El-Kharashi, et al., *Java Microprocessor: Computer Architecture Implications*, IEEE Pacific Rim Conference on Communications, Computers and Signal Processing, vol. 1, pp. 277-280 (Aug. 20-22, 1997).

R. Tomasulo, *An Efficient Algorithm for Exploring Multiple Arithmetic Units*, IBM Journal of Research and Development, vol. 11, No. 1, pp. 25-33 (Jan. 1967).

M.W. El-Kharashi et al., *Adapting Tomasulo's Algorithm for Bytecode Folding Based Java Processors*, ACM, vol. 29, No. 5, pp. 1-8 (Dec. 2001).

Yellin, et al., *The Java Virtual Machine Specification*, Second Edition, copyright 1997-1999 Sun Microsystems, Inc.

* cited by examiner

*Primary Examiner*—Kevin L. Ellis
*Assistant Examiner*—Mardochee Chery
(74) *Attorney, Agent, or Firm*—Hahn and Moodley LLP; Vani Moodley

(57) ABSTRACT

In one embodiment, the invention provides a method for accessing memory. The method comprises sending memory transactions to a memory sub-system for a first processor to an intermediate second processor interposed on a communication path between the first processor and the memory sub-system; and controlling when the memory transactions are allowed to pass through the second processor to reach the memory sub-system.

26 Claims, 9 Drawing Sheets

Figure 4a: READ CYCLE TIMING

APPLICATION PROCESSORS AND MEMORY ARCHITECTURE FOR WIRELESS APPLICATIONS

RELATED APPLICATIONS

The present application is related to application Ser. No. 09/208,741 filed Dec. 8, 1998; and to application Ser. No. 09/488,186 filed Jan. 20, 2000, and to Application No. 60/239,298 filed Oct. 10, 2000, and to application Ser. No. 09/687,777 filed Oct. 13, 2000, and to application Ser. No. 09/866,508 filed May 25, 2001, and to Application No. 60/302,891 filed Jul. 2, 2001, and to application Ser. No. 09/938,886 filed Aug. 24, 2001, and to Application No. 60/306,376 filed Jul. 17, 2001, and to application Ser. No. 10/187,858 all of which are incorporated by reference herein.

FIELD OF THE INVENTION

This invention relates to memory access within a computer system. In particular, the invention relates to a method for accessing memory and to a computer system which implements the method.

BACKGROUND

In the last few years the use of wireless technologies has been very prevalent, in particular wireless cellular telephones. Cellular telephones deploy various types of radio frequency baseband and base station modern protocols such as Code Division Multiple Access (CDMA), Global Systems for Mobile Communication (GSM), General Pocket Radio Services (GPRS), (PDC) etc.

In general, a cellular telephone has a baseband chip which provides the computing needs for voice communications. This baseband chip usually includes a Central Processing Unit (CPU), a memory interface for interfacing non-volatile (FLASH type memories) or volatile Pseudo Static Random Memory (pSRAM), Static Random Access Memory (SRAM), Synchronous Dynamic Random Access Memory (SDRAM) type memories) memories, a Liquid Crystal Display (LCD) controller, keyboard and audio devices or interfaces to, and a mechanism to interface Radio Frequency (RF) components to establish a link to a base station.

Until recently, cellular telephones were used for voice only communications only, but with the Internet, various wireless carriers such as SKT, J-Phone, DoCoMo, Verizon, Vodaphone etc. have sought to provide data services to cellular telephone users in order to realize higher revenues per subscriber.

Such data services generally require a higher performance from the baseband chips. In some cases, in order to reduce the performance demands on the baseband chips, an application chip may also be provided to execute specific applications. The application chip and the baseband chip generally require a memory sub-system.

The memory sub-system of the cellular telephone, represents one of the highest cost components of the cellular telephone, and thus the manner in which access to the memory sub-system by the baseband chip and the application processor can have a significant effect on the cost and performance of the cellular telephone.

BRIEF DESCRIPTION OF THE DRAWINGS

FIGS. 4a, 4b, 4c, 4d are timing diagrams illustrating various types of accesses to memory.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The data services for which cellular telephones can be provisioned include location based services, real time or delayed news which can be world news or by geographic location, dating services which show pictures, streaming video from sporting events, two-dimensional (2D) and three-dimensional (3D) gaming, Moving Pictures Experts Group (MPEG4) or Joint Photographic Experts Group (JPEG) support or multimedia messaging with or without the use of cameras which may be built-in to the cellular telephone, etc. Each of these data services are enabled by applications, that require increased performance by the baseband chip. While it is feasible to incorporate the application functions in the baseband chip, it is also possible to separate the baseband modem function and at least some of the applications into two separate chips. The second chip would also include an interface to the memory sub-system of the cellular telephone.

The present invention provides a mechanism to share memory between the baseband device and application processors in a space and cost restricted cellular telephone environment. The invention provides a mechanism to deploy application processors in conjunction with baseband processors such that the memories required in a cellular telephone or other such system, e.g. Personal Digital Assistants (PDA's), two-way pagers, pocket PC's, notebook computers, etc. are shared by the baseband and the application processor resulting in lower power consumption and lower cost. In particular, the mechanisms required to share the memory and arbitration required for accessing the memory sub-system is such that a baseband without a WAIT or READY signal will have immediate access to the memory sub-system and the application processor if accessing memory will prematurely terminate or abort its access and retry later.

Figure 1A:
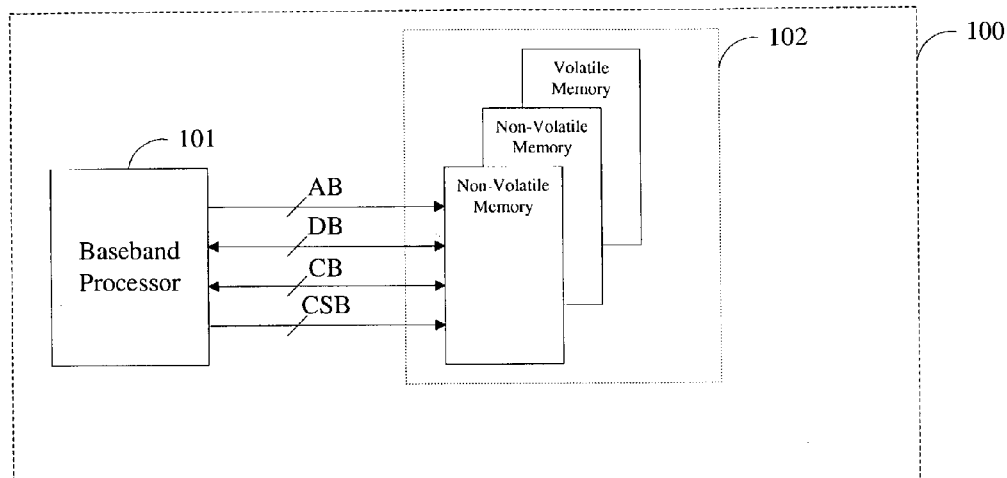
FIG. 1a is a drawing of a baseband processor and its memory sub-system

FIG. 1a shows an example of the current topology of how a baseband chip or processor 101 is connected to various memories that define a memory sub-system 102. The baseband processors baseband bus typically comprises addresses (AB), control (CB), chip selects (CSB) as well as the data bus (DB). In a typical cellular telephone, there are various types of memories, i.e. non-volatile memories such as NOR Flash and/or NAND Flash and/or mirror-bit Flash or ROM as well as volatile memories such as SRAM (e.g. 6 transistor based memory) or pSRAM (pseudo-static ram or equivalent) or SDRAM (synchronous DRAM) based memories. Some of these memories may be able to support burst mode operation. The memories 102 are shown overlapping to indicate they have same address bus (AB), data bus (DB) and controls (CB) connected between the memories and the baseband processor 101 and they may have individual chip selects (CSB) connected from the baseband processor. It is also possible to incorporate volatile and non-volatile memory on the same piece of silicon as the baseband chip. Typically, boot code and other resident software would reside in the non-volatile memory such as NOR Flash or as ROM and the runtime data and/or down loaded application(s) would run from volatile memory. The downloaded application(s) could also be stored in non-volatile memory such as Flash.

The data bus (DB) between the baseband processor and memories in a typical cellular telephone is 16 bits wide but can be 32 bits or more. The control typically has signals such as OE (output enable), WE (write enable) and BEs (byte enable/s). There are also multiple CSB (Chip selects) for each memory device the baseband interfaces to and there may also be CSB to address other devices on the same baseband bus, such as LCD, audio, or digital camera devices etc., which are not shown in the figures.

Some baseband processors also support a WAIT signal which when asserted by another device would cause the baseband processor to wait for the current read or write transaction or access cycle on the baseband bus. Alternatively a READY signal could be used where the assertion of the READY signal indicates to the baseband processor that the data is available on the baseband bus (DB) to be read or the data on the baseband bus has been written or can now be written. It is also possible to use the WAIT signal in the same manner as the READY signal and READY signal in the same manner as the WAIT signal.

In a typical cellular telephone, the baseband 101 has control of the baseband bus and the baseband initiates transactions on this bus. The transaction types or access types includes normal reads and writes or burst reads and burst writes. In one embodiment, the burst access type transactions may have a clock sourced from the baseband 101 to the memory. It is possible to provide a mechanism for other devices to request control (i.e. multi-master functionality) of the baseband bus in order for other devices to initiate transactions on the baseband bus. While the mechanism for requesting such control using a request and grant type signaling protocol is not key to this invention, those skilled in the art will understand the various arbitration schemes and interconnects between the baseband processors and other devices wanting control of the baseband bus.

Figure 1B:
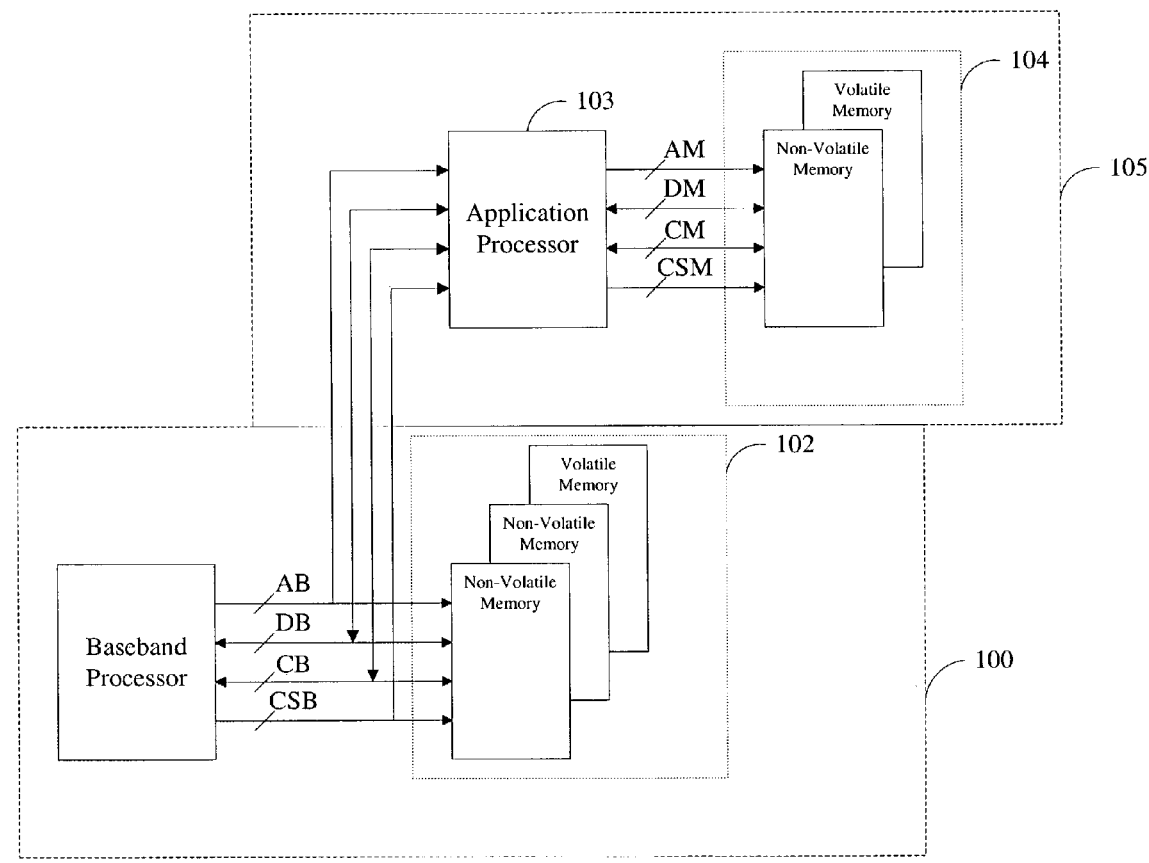
FIG. 1b is a drawing of a baseband processor, its memory sub-system, an application processor with its own memory sub-system coupled to the baseband processor

In cellular telephones where an application processor is used, the application processor also needs access to various memories (volatile and/or non-volatile). It is not practical to share the memory used by the baseband processor if the baseband has no multi-master functionality on the baseband bus and no WAIT or READY signaling available FIG. 1b is exemplary of a system where the application processor 103 interfaces to the baseband bus and the baseband maintains control of the bus. The application processor is a slave device on the bus, the baseband processor being the master. The application processor 103 would typically have a communication buffer for communicating between the baseband processor and the processor/s residing in the application processor. In multi-master systems, the communication buffers and semaphores can also be incorporated in the baseband processor. In one embodiment, the communication buffer is a dual port memory or a single port memory implemented as a dual port memory, embedded in the application processor. The amount of memory may vary based on the application. In another embodiment, communication between the baseband and the application processor 103 may be achieved by having one or more semaphores in hardware as either registers or RAM in the application processor, with a defined protocol and the data may reside in the memory 104 interfacing to the application processor. With the communication buffer in the application processor, the semaphores would reside in the communication buffer in predefined locations or as separate registers or memory in the application processor, or in memory sub-system 104. This enables the baseband to operate concurrently with the application processor 103. The system of FIG. 1b requires space for memory sub-system 104 and the application processor 103. Additionally, since the memory sub-system 102 cannot be shared, there would be the extra cost and power consumption of the memory sub-system 104. It is possible to mechanically stack the application processor 103 and the memory sub-system 104 into one package 105. The bussing and interface between the application processor 103 and the memory sub-system 104 does not have to be made available at the external pins or balls of the stack package 105 other than for testing in production. Only the baseband bus interfaces have to be available at the pins or balls of the stack package 105. At least some of the system busses e.g. between 103 and 104 can be done on a silicon interposer or the substrate of the package.

The application processors 103, 201, 203 and 301 have internally the necessary mechanisms to execute applications. Further, the application processors 103, 201, 203 and 301 may also implement the various communications buffers mentioned above. The mechanisms required to execute applications includes an interface to the baseband processor, one or more CPUs and/or Digital Signal Processors (DSPs) including associated caches for instructions and data or a unified cache. The various processors additionally include one or more write buffers in order to enhance data write performance for the various processors, a memory controller to interface to the memory sub-system, a state machine for the internal bussing scheme and arbitration for the internal bus and memory sub-system access by the various devices, and state machine/s for the memory controller, etc. Additionally, the application processors 103, 201, 203 and 301 are capable of accelerating Java byte code execution or other platform independent intermediate language such as .NET. In one embodiment the application processor has a hardware accelerator for stackbased virtual machines such as Java or .NET.

In one embodiment the Java byte code accelerator is integrated with one of the CPU's and, when operational, shares the instruction and/or data caches or a unified cache. In another embodiment, the Java byte code accelerator is implemented as a stand-alone accelerator. The stand-alone accelerator also includes instruction and/or data caches or a unified cache. In one embodiment, not all Java byte codes are executed by the accelerator. The Java byte codes which are not executed by the accelerator, are executed in software by the CPU in the application processor or by the baseband processor. In order to request the baseband processor to execute some of the Java byte codes in software, it is necessary to provide data as to which Java byte codes to execute in software, the location in memory or the Java program counter (Java PC) for the java byte codes to execute in software, and other parameters to the baseband processor, e.g. for the byte code 'new' or 'newarray', at least the Java PC and the object reference needs to be provided. To accomplish this the application processors have a two-way communications buffer similar to the one described below or the same communication method described below would be used. A signal and/or a status bit in a register is also required to indicate that the accelerator is requesting the baseband or the CPU in the application processor to execute the Java byte codes. This signal may be polled or used as an interrupt. Further, the application processors have other peripherals or accelerators such as for MPEG4, digital cameras, LCD controllers, Dynamic Memory Access (DMA) engines, video scalars, 2D/3D graphics accelerators, on chip frame buffers for graphics and/or video, IIC/S interfaces, Extensible Mark-up Language (XML) accelerators, communications ports such as Synchronous Data Link Control (SDLC)/High-Level Data Link Control (HDLC) etc.

The application processors may also be referred to as application accelerator chips. The application processors have various internal registers to configure the memory controller as well as other peripheral functions. Further, for the embodiment shown in FIG. 1b, there would be a communication buffer to communicate between the baseband and the application processor as noted above. This communication buffer may be made configurable as to its size and how many semaphores are required to establish communication with the base band processor. The configuration of the communications buffer would default to some known value after reset, and may be programmed with different values by the baseband processor.

In order to establish full duplex communication between the baseband processor and the application processor, both processors would have to manage these semaphores. One example of establishing communication between the baseband and application processors uses the following protocol. Upon starting (or hardware or software initiated reset) the communications buffers are cleared (or assumed to be cleared), and the semaphores are cleared or indicate that there is no valid data in the communications buffers. The communications buffers are divided into two segments, the first segment is for the baseband processor to write and the second segment is for the baseband processor to read. The application processor reads the first segment and writes into the second segment. Additionally, both processors have their own semaphore registers (alternatively the semaphores may be in memory or known locations in the communications buffers) where the baseband processor and the application processor can read and/or write their respective semaphores for control and messaging.

The processor receiving a message can only clear the semaphore written by the processor writing the message. Instead of clearing the semaphore, an acknowledgement flag message can also be stored in the semaphore register. Upon leaving the reset state or startup, the respective processors write a query message into their respective communication buffer segments which they are allowed to write in, inquiring for the presence of the other processor and writing a message in their respective semaphore registers indicating that a valid message has been written into their respective communication buffers. One or both processors can initiate such a query.

Both processors after having read a message may clear or write an acknowledge message in the semaphore register written by the other processor indicating that the message has been read. Other examples of messages which may be written in the semaphore registers include ready, error, or retry messages, etc. Only after the semaphore has been cleared by the processor receiving the message, the processor sending the message is able to respond to the query by writing the communication buffer again or posting another message. The application processor requires at least one CSB (chip select) to enable the baseband to select writing or reading from the application processor 103. The exemplary embodiment of FIG. 1b. requires additional memories for the application processor. Further, the application processor 103 does not share the memory sub-system 102 of the baseband processor.

Figure 2A:
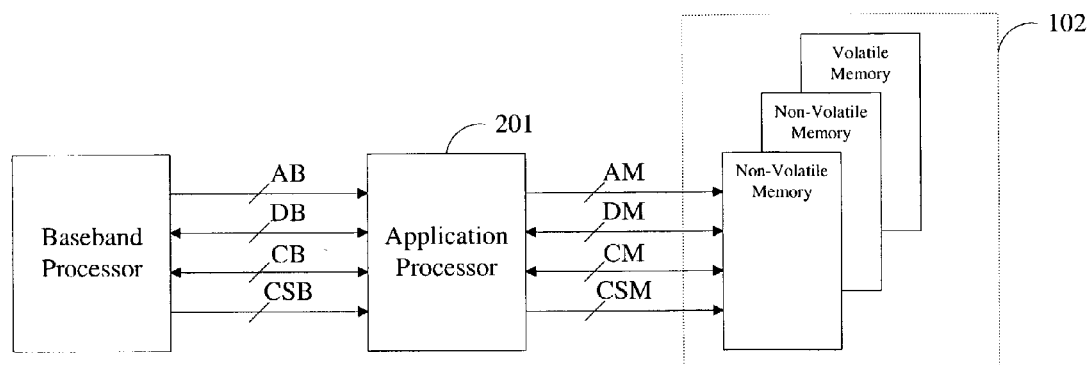
FIG. 2a is a drawing illustrating a shared memory sub-system between the baseband processor and an application processor where the baseband processor accesses the memory sub-system through the application processor in pass-through mode.

FIG. 2a illustrates an application processor 201 inserted in the path between the baseband processor and its memory sub-system 102. For the baseband processor to access the memory sub-system it has to pass-through the application processor. In this architecture, the baseband does not have a WAIT or READY signal input, and the application processor 201 must provide a mechanism for the baseband to access the memory sub-system 102 as demanded by the baseband processor. There are various methods for the application processor to allow the baseband processor to access the memory sub-system. One method is through the communications buffers described above. Another method is to directly pass through the application processor bypassing the communication buffers as explained in more detail below. In one embodiment, either one or both of the above methods is allowed.

Figure 4B:
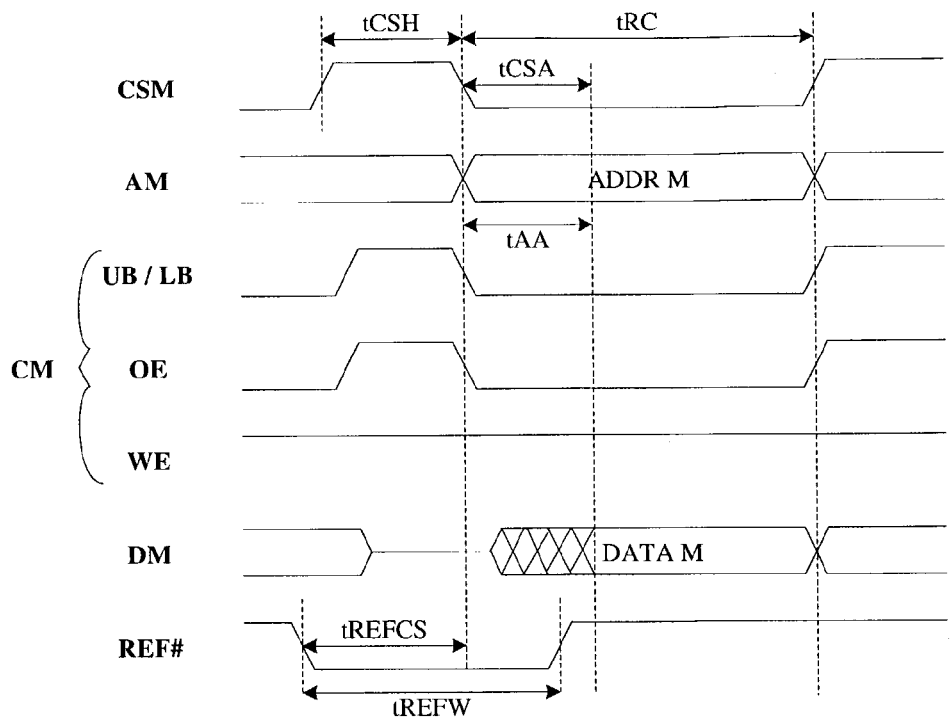
Figure 4B:
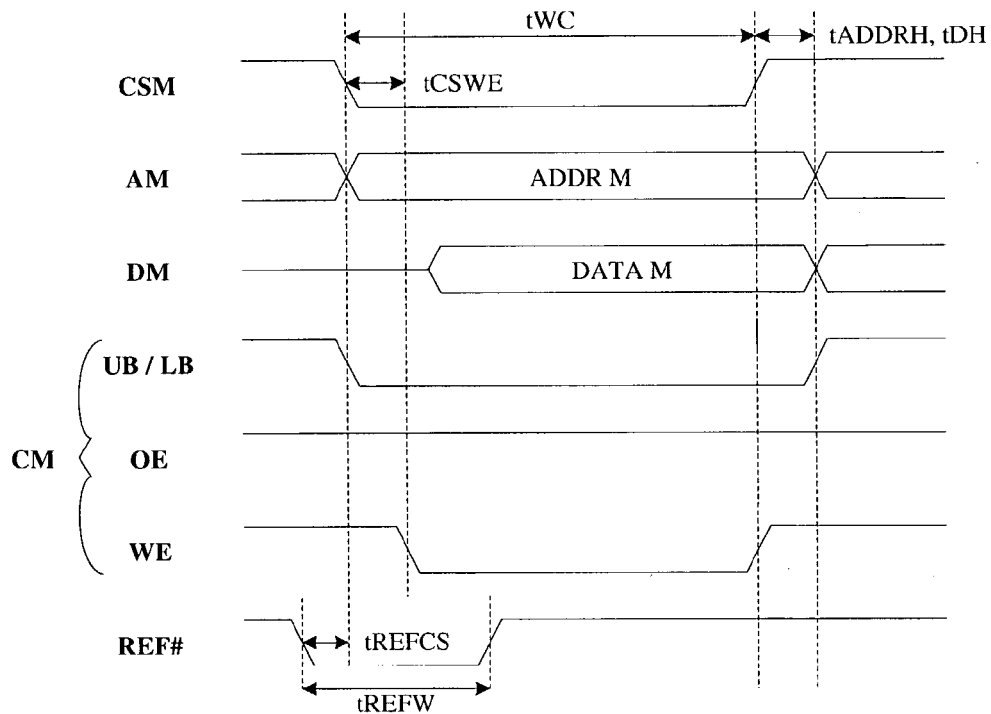
Figure 4C:
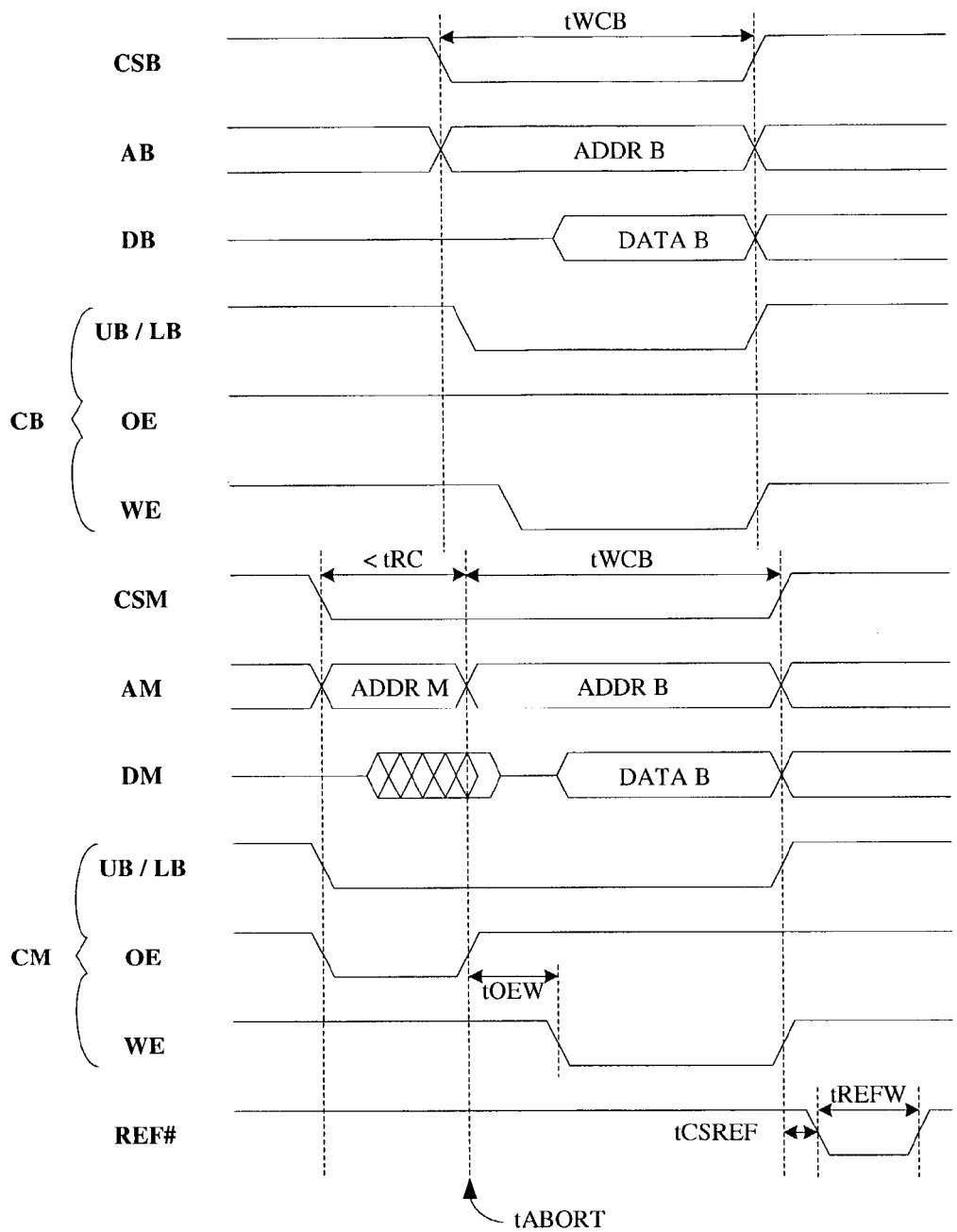

FIGS. 4a and 4b show typical read and write cycles for a baseband processor. While these are shown to be asynchronous, one skilled in the art would realize that other cycles are possible including burst and synchronous where a clock is present. In this example, tRC (read access cycle time) and tWC (write access cycle time) represent the time taken to complete read and write memory access cycles, respectively. If the application processor is accessing memory and is partially through its transaction or access, and the baseband processor begins its access to the memory sub-system, the application processor has, in one embodiment, the capability to finish its current transaction and then allow the baseband processor access to pass-through to the memory sub-system 102. This requires the baseband processor to have access cycles that are longer than the access cycle times required if it did not have to wait for the application processor 201 to finish its cycle. In another embodiment, the application processor 201 will immediately abort its current access in order to allow the baseband processor to pass-through. In this embodiment, the application processor 201 keeps an indication of having aborted its current access and immediately allows the baseband processor to pass-through to allow access to the memory sub-system 102. FIG. 4c shows a memory read cycle initiated by the memory controller in the application processor being (CSM, AM, DM, UB/LB, OEM, WEM) aborted at time tabort due to the baseband processor writing to the memory sub-system indicated by CSB going low. The memory access initiated by the application is shown as aborted by the address AM being asserted for a time less than the full access time (<tRC).

Figure 4D:
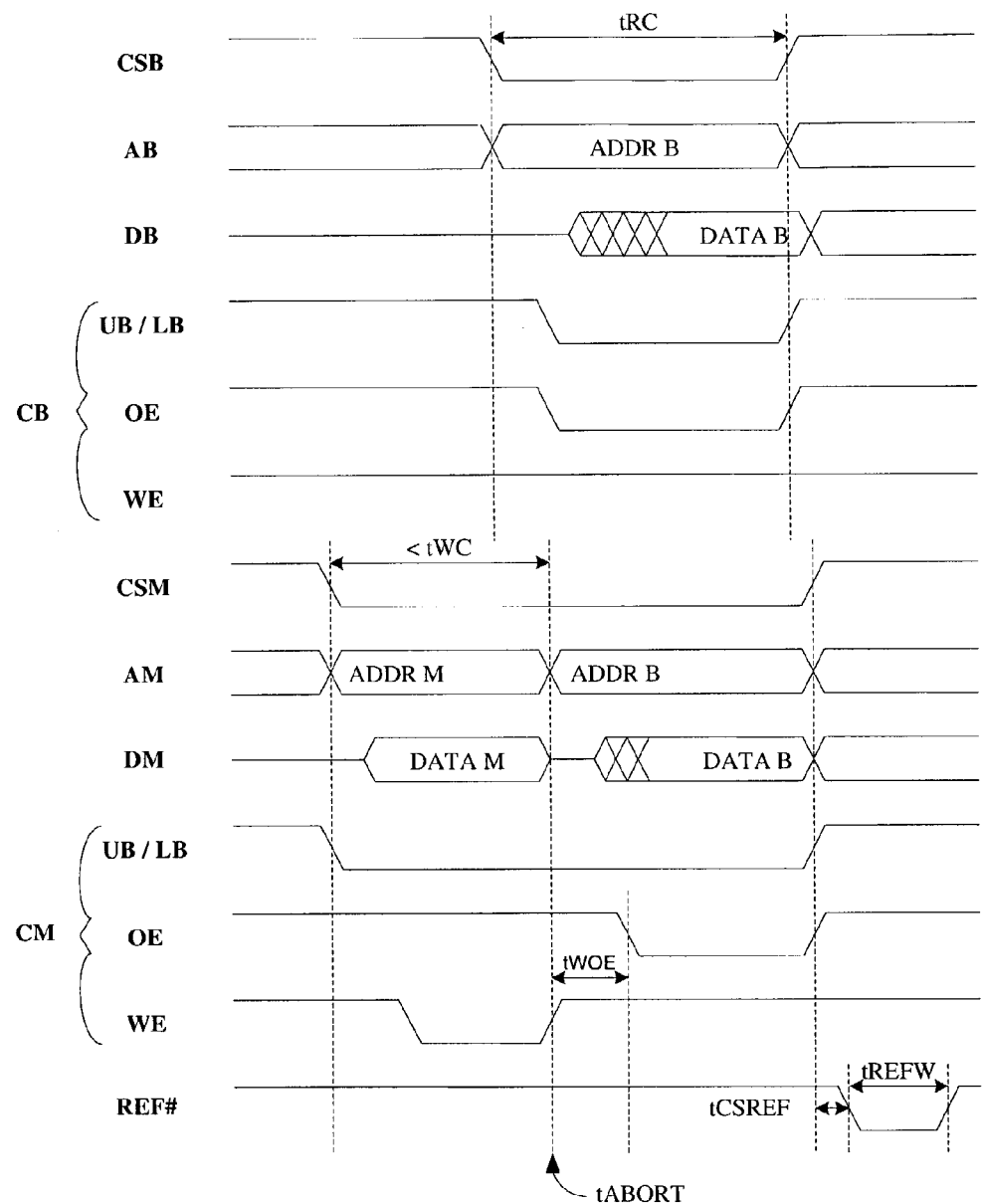

FIG. 4d shows the application processor writing to a memory and being interrupted by the baseband wanting to read the memory hence causing the memory controller in the application processor to abort its write cycle indicated by the address AM being less than the full cycle (<tWC). While not all combinations are shown, one of skill in the art can understand all the combinations including the baseband interrupting and accessing a different memory in the memory sub-system where the CSM (chip select to the memory) asserted by the application processor would also be shorter than the full cycle.

Figure 5:
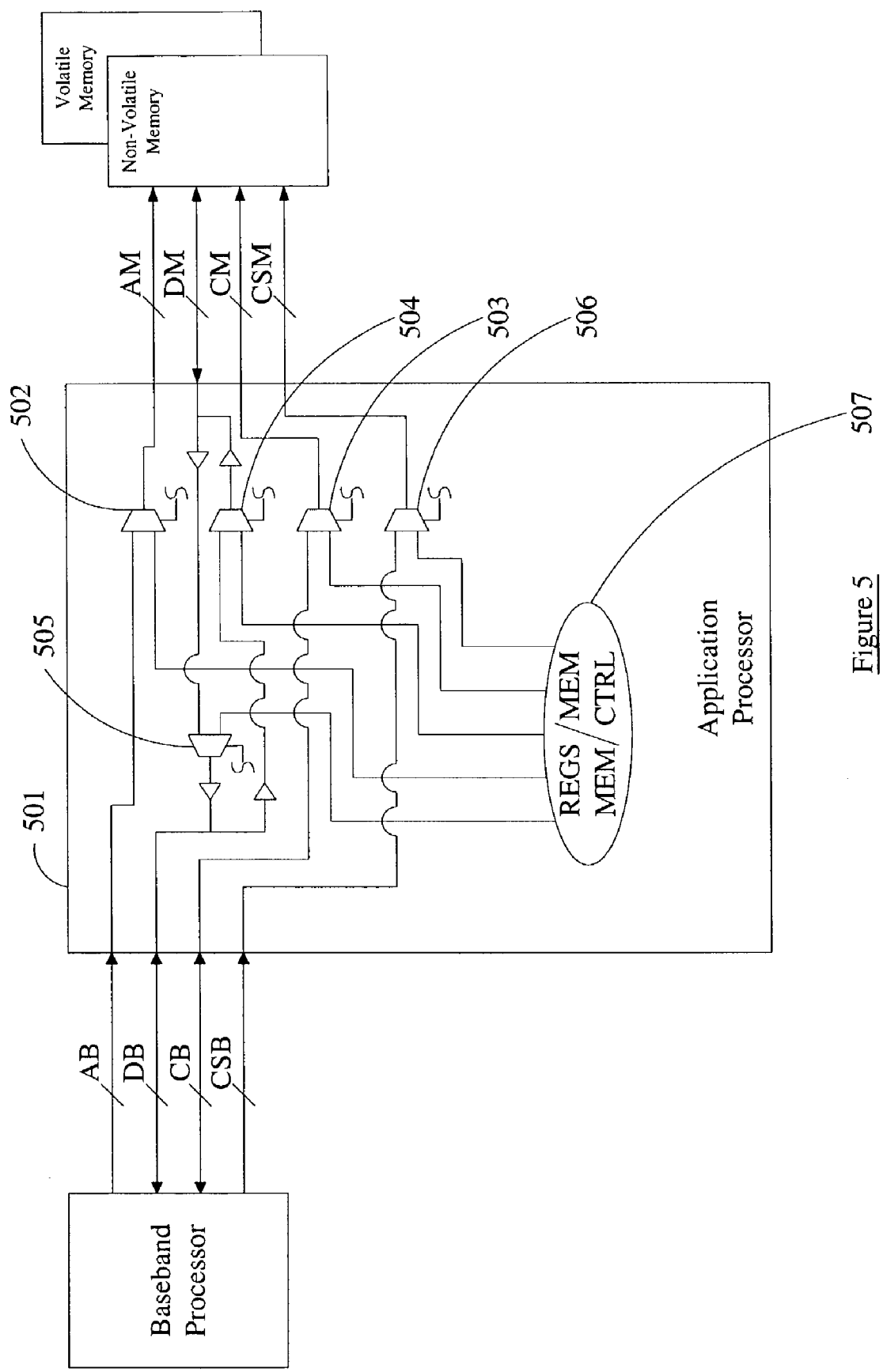
FIG. 5 is a drawing illustrating various multiplexers for pass-through of the baseband processor and access of memory by the application processor.

The pass-through of the baseband accessing memory can be accomplished by having a set of multiplexers (as shown in FIG. 5) for the addresses, data and control which are switched to select the baseband bus address, data, and control due to the assertion of one or more CSB (chip selects from the baseband for access to the memory sub-system 102). When the application processor 201 is accessing memory the multiplexers are set to select the address, data, and control lines produced by the memory controller in the application processor 201. The assertion of one or more of the CSB would be synchronized by clocked flip flops and/or S/R (set/reset) flip flops to generate an indication that the baseband is passing through, and hence produce an indication the application processors access was prematurely terminated. Once the synchronizers indicate the baseband is no longer accessing memory, the application processor's memory access may be retried.

In one embodiment, a synchronizer for detecting a baseband processor access uses both rising and falling edges of the clock within the application processor. This facilitates faster detection of the baseband access. The same clock is used by the memory controller of the application processor. Alternatively, a clock stepped up in frequency by a phase locked loop (PLL) or stepped down in frequency by clock divider circuitry may be used. It should be noted that truncating a volatile memory device's access could result in a loss of data in the memory core for memories based on dynamic ram technology such as pseudo static rams. The six transistor (6T) based SRAMS also have this issue when writing the SRAM and a write cycle is terminated. In a 6T SRAM, if a write cycle is terminated while the row and/or column decoders have not finished decoding the address presented, the data may be lost or written to an unknown location in memory.

To avoid losing or corrupting data in an unknown location, in one embodiment, the application processor 103, 201, 203, 301 will assert the WE signal to the memory sub-system after the decoders in the memory have settled or a full access time has been met. After this decoder settling time, the location where data may get corrupted is known and is the address presented to the memory for writing. The memory controller in the application processors described above are capable of producing the necessary types of memory cycles including burst and synchronous cycles. In one embodiment the application processor 103, 201, 203, or 301 will retain the address and data of the location that was corrupted and rewrite data to that address once the baseband processor is finished with its access. While this technique is possible with 6 transistor (6T) SRAM due to its structure, pseudo static srams (pSRAM) have issues of losing data in multiple locations due to prematurely terminated cycles of the types shown in FIG. 4c, and FIG. 4d, where the cycle is less than tRC (<tRC) or less than tWC (<tWC), respectively. This is due to the pSRAM having internal structures made of one transistor and one capacitor for each bit and so has a structure resembling DRAMS.

As with DRAMs, pSRAMS also need to have periodic refresh which is produced internally. Typically, pSRAMS operate faster internally than the specified or advertised access speeds. In a typical pSRAM, there is a mechanism for producing a refresh request using a timer, where a row of data will be read and restored. There is also a row address counter which may increment or decrement to indicate which row to refresh. For each refresh request, a row of data is refreshed in this manner until all rows are refreshed. This refresh mechanism runs constantly so that all the rows in the pSRAM are regularly getting refreshed. If the refresh mechanism were to stop, the pSRAM would lose data after some finite time. It may be that a refresh cycle has just started and an external device wants access to the pSRAM. The pSRAM typically finishes the refresh cycle and then allows access to the external device. The external device would see a longer access time (approximately twice as long) since it has to allow the refresh cycle to finish. Since the refresh request is asynchronously produced internal to the pSRAM, it is not predictable as to when the refresh cycle occurs and so the access time specified for the pSRAM includes the refresh cycle time. When an internal refresh request coincides with an external access, there is logic to arbitrate and manage the access as well as the refresh.

Typically, pSRAMS and SDRAMS go through a address decode, internal row access and pre-charge cycle, the pre-charge cycle replenishing the data since the access usually discharges the data held in the core for the particular row being accessed. One of the requirements of such pSRAMS is that at least the address has to be stable during the entire memory access cycle. If the address is not stable for the entire cycle, it is possible to lose a whole or partial row of data. This is because once a row access has started and if the address for the row changes before the pre-charge cycle of the DRAM cells, a new access will ensue for a different row and so the data for the previous row will be lost. In one embodiment, the pSRAM waits until the pre-charge cycle has completed before starting the access for the new address. In one embodiment it would be required that the pSRAM would have this characteristic for both address and chip selects.

If the application processor is accessing pSRAM when the baseband processor begins a pass-through access and a refresh request becomes pending, the pSRAM has to cope with three devices requiring access to the pSRAM resulting in corrupted data. If each of the three accesses were to happen at the same time and allowed to finish one after another, the access time for the one of the devices would be more than two times longer than the internal access time. This would cause considerable slow down in performance.

To overcome this, in one embodiment, a mechanism that disables the internal refresh request of the pSRAM and generates an external refresh request signal indicating when to refresh, shown in FIG. 4c and FIG. 4d as REF# is provided. The disablement of the pSRAM internal refresh may be achieved by assertion of another signal. In one embodiment, the external refresh signal is generated by the application processor when the application processor is not accessing the pSRAM by having a refresh counter and arbitration logic. While the refresh request is generated by the application processor, the row address counter in the pSRAM may be utilized by the pSRAM to indicate which row to refresh. Alternatively the row address counter may be sourced from the application processor.

In one embodiment, when the application processor is accessing the memory sub-system and the baseband processor begins its access to the memory sub-system before the application processor has completed its access, the application processor asserts the WAIT signal to the baseband processor, or de-asserts the READY signal to the baseband processor depending on which type of signal is supported by the baseband processor. These signals would stall the baseband processor while the application processor completes its access. In the case of the READY signal being asserted, the baseband processor may expect valid data for its read or write transaction completed. In this case, the application processor, after having finished its access, would keep the WAIT signal asserted or the READY signal de-asserted. The application processor would then enable the multiplexers to source the baseband addresses, data (in case of a baseband write access, other wise the data is read), and control lines to the memory sub-system, thereby initiating an access on behalf of the baseband processor, for a time sufficient to make a full access to the memory sub-system. Thereafter, the application processor would de-assert WAIT signal or assert READY signal to the baseband processor. Thus, when the WAIT signal is de-asserted or the READY signal is asserted, the baseband processor would get valid data.

The application processors 103, 201, 203 and 301 include logic to detect the baseband processor requiring access while the application processors are accessing the memory sub-system. The application processors also include state machines to at least partially manage the memory access on behalf of the baseband.

In one embodiment, the memory sub-system has SDRAM with multiple internal banks, in addition to other types of memory. If the baseband processor presents asynchronous type timing, and the SDRAM memory expects synchronous timing along with a clock, the application processor detects the baseband access and synchronous to the application processors clock, accesses the SDRAM to accomplish a read, write, burst read or burst write into the SDRAM. The clocks for the baseband and application processor may be synchronous or asynchronous to each other.

In one embodiment, to avoid the loss of data in the SDRAM in a similar way to pSRAMs as explained above, when the application processor is accessing the memory sub-system and the baseband processor initiates an access to the memory sub-system (thus requiring a pass-through), and the application processor has not yet finished, the application processors 103, 20, 203 and 301 would access one or more of the SDRAM banks agreed upon or allocated to it, but not all the banks in the SDRAM. Additionally, the baseband processor would only access the banks which are not accessed by the application processor. This mode of operation would only be observed while the application processor is running; otherwise the baseband can access all the banks at any time. With this mode of operation, the SDRAM controller in the application processors 103, 201, 203 and 301 can leave at least one SDRAM banks open for the application processor when the baseband requires pass-through, and simply open and/or close the banks required for the baseband processor during and/or after pass-through.

Figure 2B:
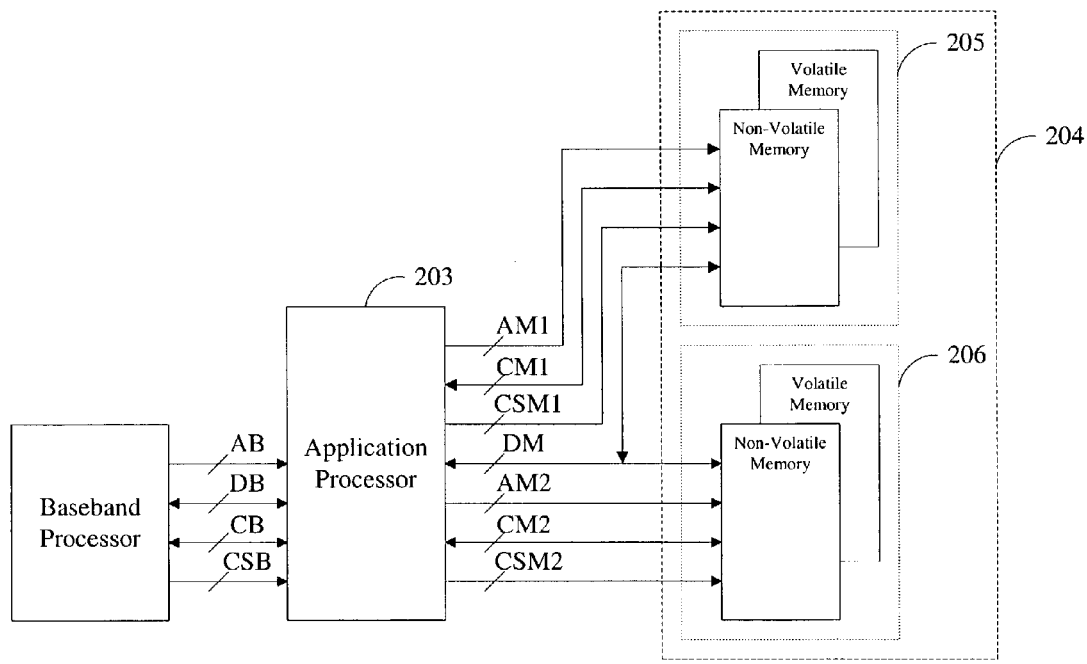
FIG. 2b is a drawing of an alternate memory sub-system shared between the baseband processor and an application processor, where the memory bus is split and the baseband processor accesses the memory sub-system through the application processor in pass-through mode.

In another embodiment, the application processor 203 would have a split bus available to the memory sub-system where the memories are in two groups as illustrated in FIG. 2b. Group 206 would have the address (AM2), data (DM), chip selects (CSM2), and control (CM2), and group 205 would have its own address (AM1), chip selects (CSM1) and control (CM1), while sharing the data bus (DM) with group 206. The baseband processor would be allowed to access group 206 on demand and only access group 205 when the application processor 203 is in a standby mode or not accessing memory. Conversely, the application processor can access group 205 memory on demand as well as non-volatile memories in group 206 since non-volatile memories do not have the issue of losing data due to prematurely terminated cycles. This restriction is not required if 6T SRAMs are used for volatile storage, in which case either the application processor or the baseband processor could access both groups at any time. Additionally since the baseband processor can access group 206 memories at any time, the address and control other than OE going to group 205 would remain stable and not change while the baseband processor is accessing group 206. At the same time since the data bus is shared, at least the OE control needs to be independently controlled for both groups 205 and 206 so there is no contention in driving the data bus from the memory groups 205 and/or 206 and/or from the application processor 203, concurrently.

To avoid any conflict on the data bus, the application processor 203 would de-assert the OE going to group 205 memories. In one embodiment, the application processor 203 would produce an internal stall or wait in its memory controller state machine while the baseband processor is accessing group 206. The address (AM1) to group 205 memories would remain asserted and stable during this time and while finishing the access thereafter. CSM1 and/or WE, BLE, BHE going to groups 205 may be treated in the same manner as the addresses (AM1).

In another embodiment the application processor would latch the addresses (AM1) going to group 205 and keep them latched while de-asserting OE to group 205 memories to avoid data bus contention. The application processor 203 memory controller state machine would restart the memory access either from the beginning or part way through the memory controller state machine once the baseband processor is finished with its access. In order to accomplish this, the synchronizers mentioned above would be used to detect the baseband processor access whereby any CSB from the baseband processor targeted to group 206 would be synchronized to produce an indication of pass-through. If the application processor is reading data from the memories and the baseband processor attempts to write data to the memories there would be bus contention for a short period until the memories have their outputs disabled since the application processor would begin driving the data bus to the memories due to pass-through. The contention happens when the application processor is reading from one memory and the baseband processor attempts to read from or write to another memory in pass-through mode. In one embodiment, the application processor 103, 201, 203 and 301 would not drive the data bus toward the memories for a short period at the beginning of the baseband access and thus avoid any bus contention. Additionally the OE signals to all memories would be de-asserted for a similar short period even though the baseband processor may have its OE asserted. This short period is made programmable and would have a default value after reset. It should be noted that the memories in groups 205 and 206 may comprise any mix of volatile and/or non-volatile memories.

Figure 3:
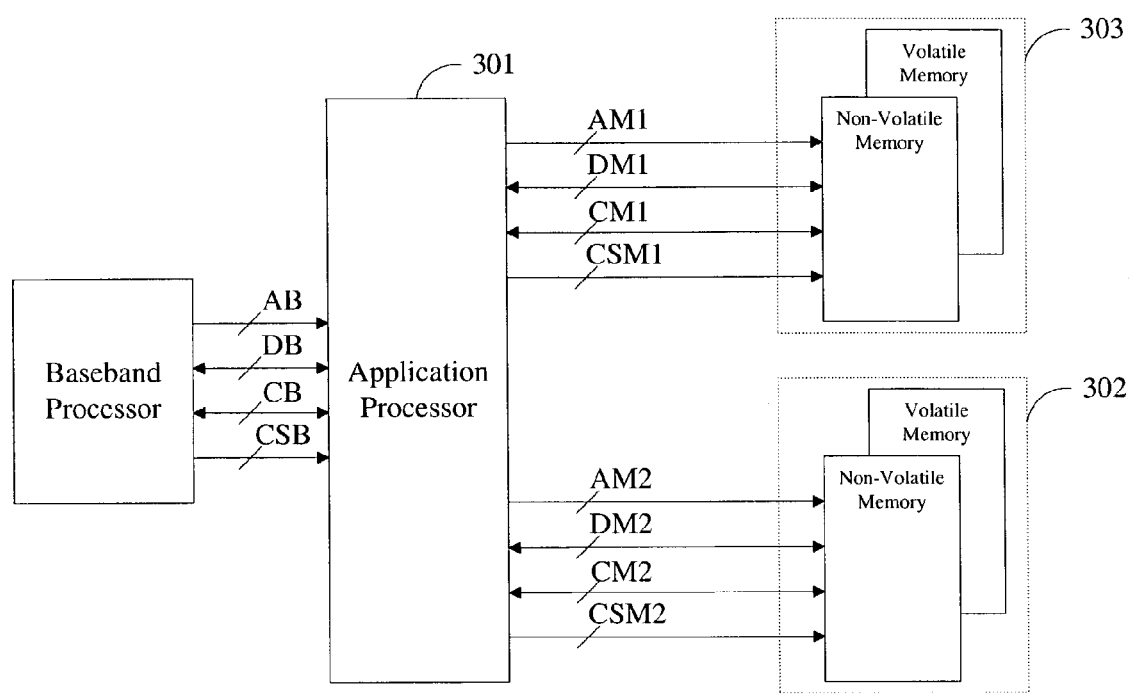
FIG. 3 is a drawing illustrating two complete buses for the memory sub-system where the baseband accesses memory on one of the buses of the memory and the application processor concurrently accesses the other memory on the other bus and when the application processor is not running or is in standby mode the baseband processor can access all the memories over any bus.

In another embodiment, the application processor 301 has two complete and independent buses to two groups of memories 302 and 303 as shown in FIG. 3. Both groups have independent address, data, chip selects and control lines. The baseband processor would, for example, access group 303 at any time and the application processor 301 would access group 302 at any time. The application processor 301 may also access non-volatile memories in group 303 by first making sure there is no access from the baseband processor to group 303. The access to the non-volatile memories can be prematurely terminated and restarted. If the memory access form the baseband processor is synchronous with the clock in the application processors and its memory controller, it is not necessary to use synchronizers to detect pass-through. Only the assertion of the CSB signals needs to detected to make the determination of when to allow pass-through.

As with application processors 103, 201 and 203, a mechanism to avoid bus contention may be incorporated within application processor 301. The multiplexers depicted in application processor 501, are used for pass-through Multiplexers 502, 503, 504, 505 and 506 may have separate select signals for pass-through operation, such that they can be controlled separately or through a common select. Multiplexers 505, 506 are used to enable passing data read from the memory to the baseband processor when the baseband processor is performing a read access to the memory sub-system, otherwise the multiplexers 505, 506 are used to read data internal to the application processor 501. In one embodiment, at least one of the multiplexers shown in 501 would also be in application processors 103, 201, 203 and 301. In one embodiment the application processors 103, 201, 203 and/or 301 and at least some or all of the memory sub-system/s are in a stack package where the application processor and memory dies are stacked in a package. In another embodiment of the stack package, some dies may be placed side by side in any one or more stack layer. In another embodiment, one of the stack layers is an interposer made from silicon to facilitate the routing of signals, buses and/or power to dies mounted on the interposer or to other dies in the stack or to the substrate of the package. This kind of packaging would provide space saving application processing to cellular telephones and other devices.

Figure 6:
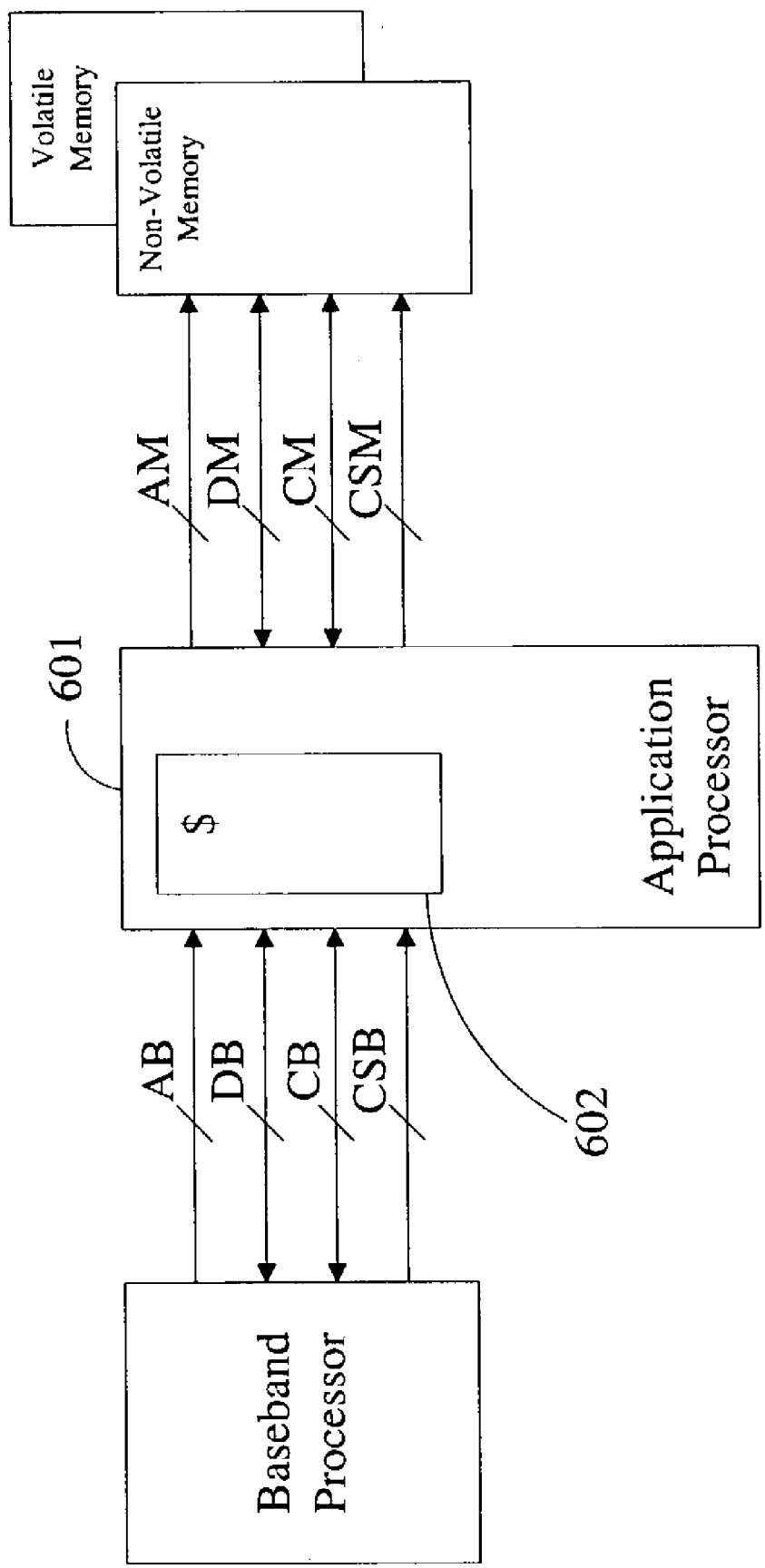
FIG. 6 is a drawing illustrating the use of L1 or L2 caches in the application to enhance the performance of the baseband processor.

Since the functionality of the baseband processor is to provide communication with a base station for voice and/or data, the performance requirement for the baseband is not very high. For this reason, there are many baseband processors in the market where the processor in the baseband does not have any cache memory. For baseband processors with no cache memory and a WAIT or READY signal, FIG. 6 shows one embodiment where a cache memory and cache controller for the baseband are incorporated in the application processors mentioned above resulting in higher performance for the baseband processor. The cache in the applications processor would appear as a Level 1 cache to the cacheless baseband processor. In another embodiment, a baseband processor which does have a cached processor would also interface to an application processor with the integrated caches such that the caches in the application processor would work as a Level 2 cache. These caches can be instruction and/or data caches or a unified cache.

Figure 7:
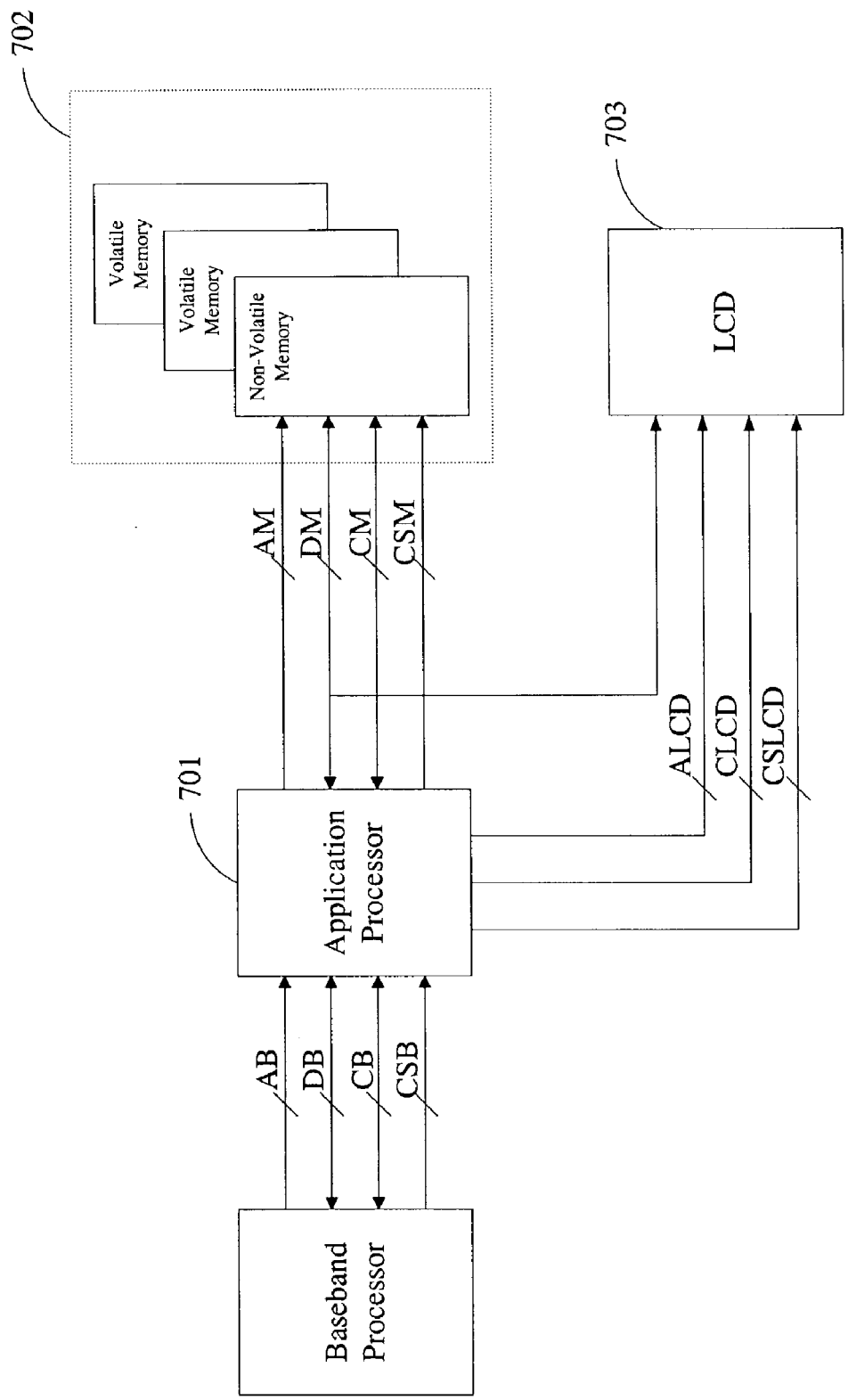
FIG. 7 is a drawing illustrating an efficient mechanism for updating or refreshing the LCD device through the application processor.

FIG. 7. shows an application processor 701, which is similar to any of the above-described application processors. In addition, the application processor 701 includes an interface to an LCD or other display device 703. In one embodiment, a frame buffer where the images are composed in the memory sub-system 702. In one embodiment, upon receiving a command from the baseband processor, the application processor 701 loads or updates the image in the display device by copying the frame buffer from the memory sub-system to the display device. The data bus from the memory sub-system is also connected to the display devices data bus and address and/or control signals from the application processor 701 are asserted to the display device to load the image into the display device. The application processor 701 performs a read access operation from the memory sub-system while asserting the address and/or control signals to the display device, thereby loading the image data as it is being read from the frame buffer, into the display device directly. This provides an efficient way to load the image data into the display device that consumes less power, thereby improving the battery life in a cellular telephone.

In another embodiment, the frame buffer is incorporated in the application processor 701 and the data is sourced directly to the display device from 701. For both these embodiments it is necessary to have an indication of the number of elements in direction X of the display device and the number of elements in the Y direction of the display device and where in the memory the frame buffer resides.

Additionally application processor 701 is capable of receiving an updated image command from the baseband processor and is capable of loading the image on the display device. The application processor generates at least some of the addresses required to read the frame buffer from the memory internally. In one embodiment, counters would be maintained for X and Y to generate the memory addresses. In another embodiment there would be an indication that the application processor 701 is busy loading the image data to the display device and/or an indication that the loading of the image is done. In another embodiment if the baseband processor attempts to access the memory sub-system while the display device is being loaded with an image, the WAIT signal would be asserted or the READY signal de-asserted until the image is loaded. The image loading may be stopped in the middle to allow the baseband processor to pass-through.

While various inventions have been shown referencing application processors 103, 201, 203, 301, 501, 601 and 701, one skilled in the art would realize that all the invention disclosed here are applicable to all the application processors.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for accessing memory, the method comprising:
   sending memory transactions to a memory sub-system first processor to an intermediate second processor interposed on a communication path between the first processor and the memory sub-system;
   controlling when the memory transactions are allowed to pass through the second processor to reach the memory sub-system; and
   further comprising synchronizing an assertion of one or more chip select signals from the first processor to indicate when the memory transactions are being passed through to the memory sub-system.

2. The method of claim 1, wherein the controlling comprises delaying the pass through of the memory transactions.

3. The method claim 2, wherein the delaying the pass through of the memory transactions comprises asserting a WAIT signal or de-asserting a READY signal to the first processor by the second processor.

4. The method of claim 2, wherein the delaying is for a period sufficient to allow a current memory cycle of the memory sub-system initiated by the second processor to complete.

5. The method of claim 1, wherein the controlling comprises aborting a current memory cycle of the memory sub-system initiated by the second processor.

6. The method of claim 5, wherein the aborting is only performed if the current memory cycle can be safely aborted without a loss of data.

7. The method of claim 6, wherein the aborting is only performed if the memory sub-system comprises memory devices that maintain data integrity when a memory access is prematurely terminated.

8. The method of claim 7, wherein the controlling comprises passing address, data, and control signals from the first processor through a multiplexer mechanism in the second processor set to select the address, data, and control signals when a chip select signal from the first processor is asserted, to the memory sub-system.

9. The method of claim 8, wherein the multiplexer mechanism is set to select address, data, and control signals generated by a memory controller of the second processor if a chip select signal from the second processor is asserted.

10. The method of claim 9, further comprising saving information relating to an aborted current memory cycle.

11. The method of claim 10, wherein the aborted current memory cycle is resumed after the passed through memory transactions complete.

12. The method of claim 1, wherein the second processor executes platform independent intermediate language instructions.

13. The method of claim 1, further comprising disabling asynchronous refresh requests produced internally with the memory devices of the memory subsystem; and generating an external refresh request signal to indicate to the memory devices when to perform a refresh.

14. The method of claim 13, wherein the external refresh request signal is generated by the second processor when the second processor is not accessing in memory.

15. The method of claim 1, wherein the first processor is a baseband processor for a mobile communications device.

16. The method of claim 1, wherein the second processor is an applications processor for the mobile communications device.

17. A system, comprising:
   a first processor;
   a memory sub-system;
   a communications path between the first processor and the memory sub-system to allow the first processor to access the memory sub-system; and
   a second processor interposed between the first processor and the memory sub-system and defining an intermediate point in the communications path, the second processor including a memory controller to control access to the memory sub-system by the first and second processors; wherein an assertion of one or more chip select signals from the first processor is synchronized to indicate when the memory transactions are being passed through to the memory sub-system.

18. The system of claim 17, wherein the communications path comprises a first bus between the first and second processors and a second bus between the second processor and the memory sub-system.

19. The system of claim 17, wherein the second bus comprises separate address and control lines coupling the second processor to first and second groups of memory devices within the memory sub-system, respectively.

20. The system of claim 19, wherein the first group of memory devices is accessible on demand by the first processor; and the second group of memory devices is accessible to the first processor only when the second group is not being accessed by the second processor.

21. The system of claim 20, wherein non-volatile memory devices within the first group of memory devices are accessible to the second processor only when not being accessed by the first processor.

22. The system of claim 17, wherein the second bus comprises two separate busses, each coupling the second processor to first and second groups of memory devices within the memory sub-system, respectively.

23. The system of claim 17, wherein the second processor comprises a detection mechanism to detect when the first processor generates memory cycle signals to the memory sub-system.

24. The system of claim 23, wherein the second processor includes a pass-through mechanism to allow detected memory cycle signals from the first processor to pass through the second processor.

25. The system of claim 24, wherein the pass-through mechanism allows a detected memory cycle signal to pass through to the memory sub-system, immediately, if the second processor is not accessing the memory sub-system.

26. The system of claim 25, wherein the pass-through mechanism delays the pass through of a detected memory cycle signal to the memory sub-system, until a current memory access of the memory sub-system by the second processor can be aborted without data loss.

* * * * *